UNITED STATES PATENT OFFICE.

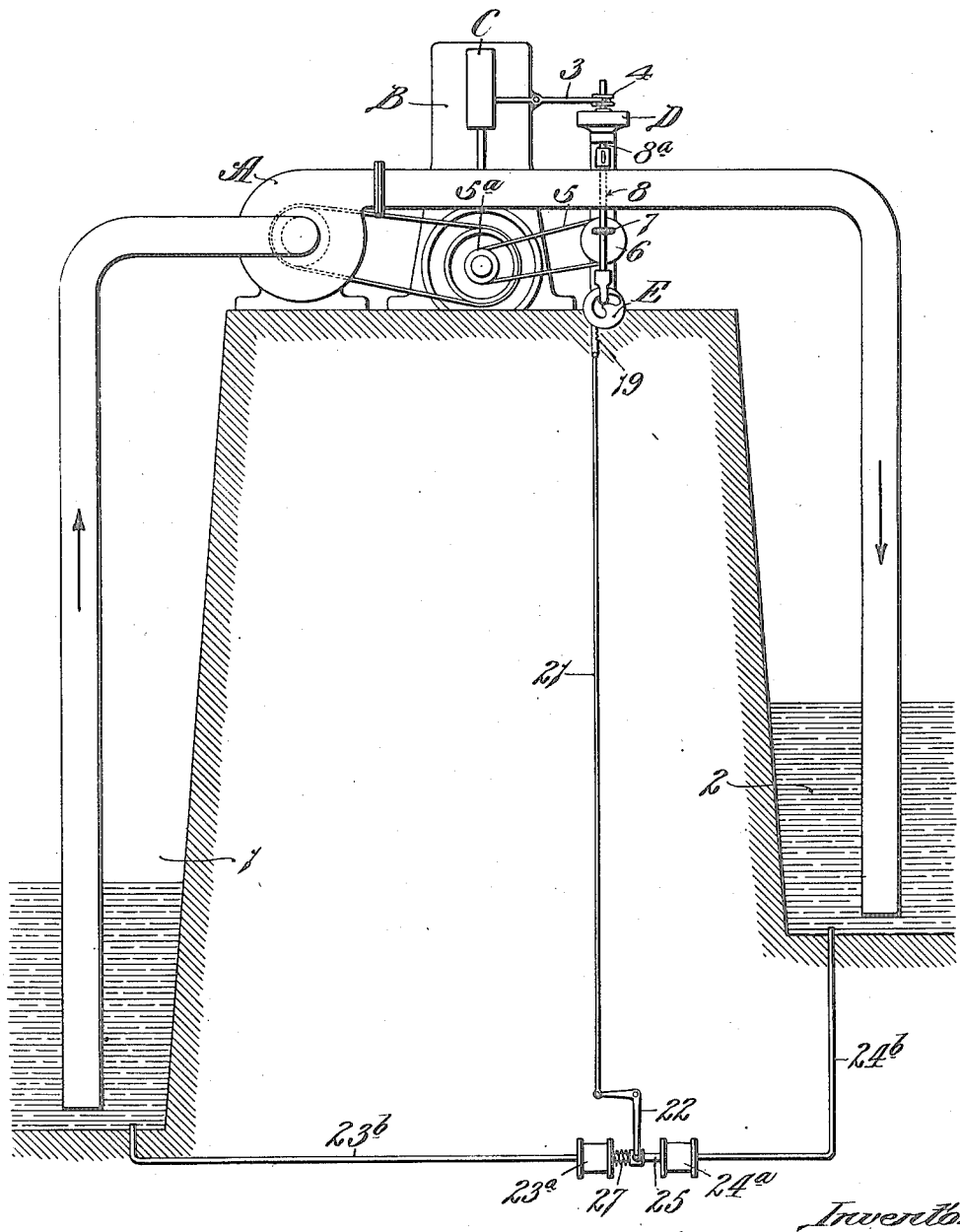

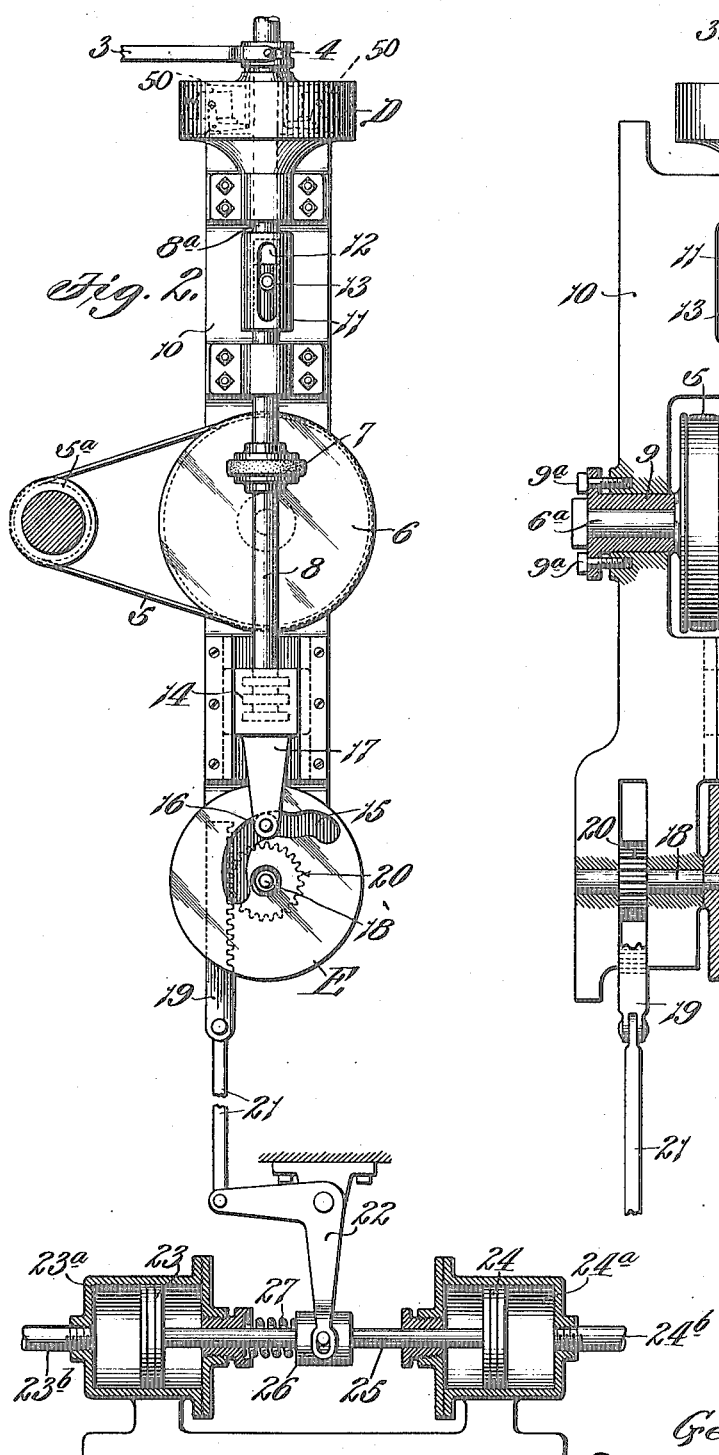

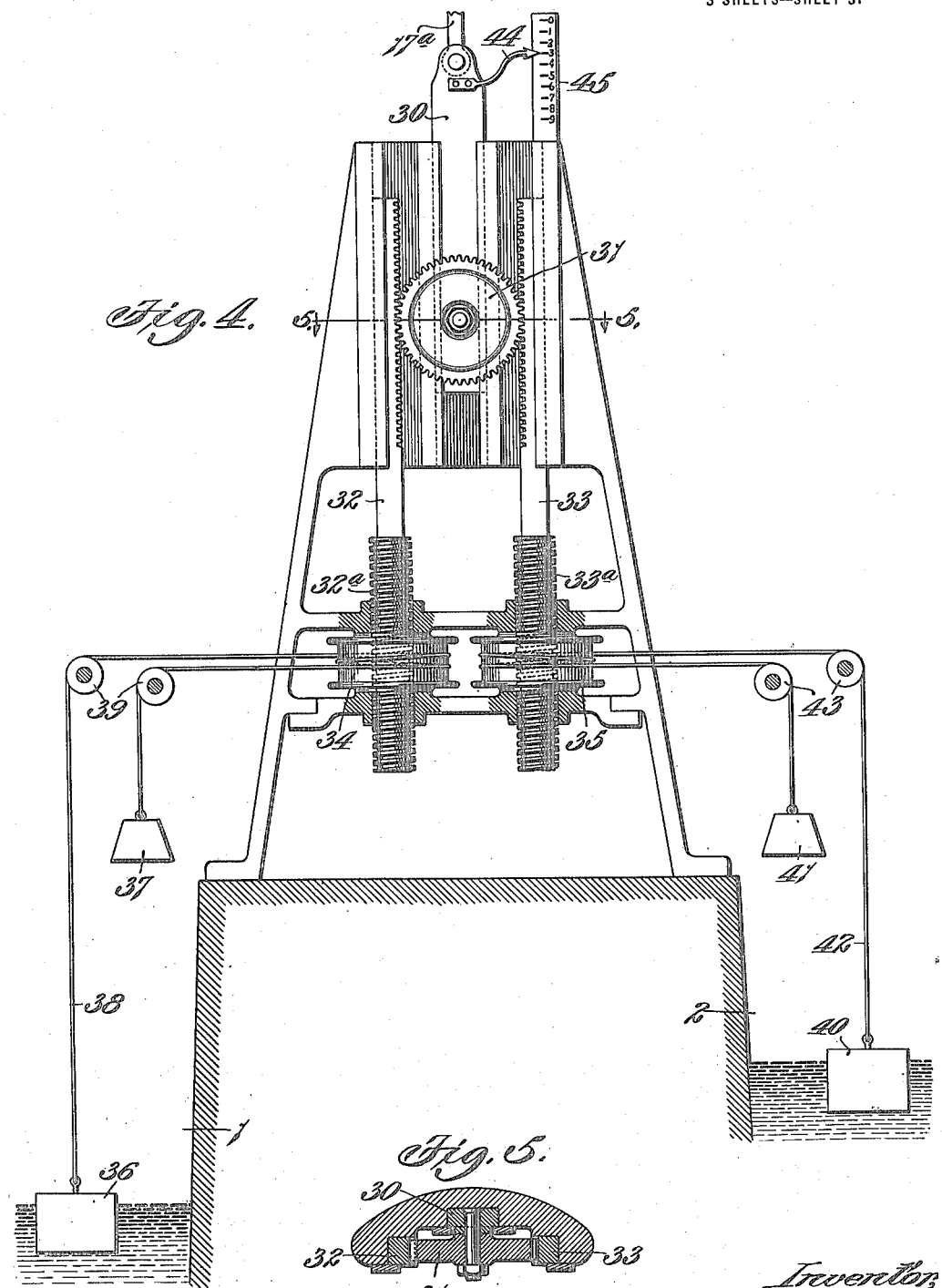

GEORGE D. POGUE, OF ST. LOUIS, MISSOURI.

SPEED-GOVERNING MECHANISM FOR PUMPING APPARATUS.

1,206,371.  Specification of Letters Patent.  Patented Nov. 28, 1916.

Application filed October 27, 1915. Serial No. 58,239.

*To all whom it may concern:*

Be it known that I, GEORGE D. POGUE, a citizen of the United States, residing at St. Louis, Missouri, have invented a certain new and useful Improvement in Speed-Governing Mechanisms for Pumping Apparatus, of which the following is a full, clear, and exact description, such as will enable others skilled in the art to which it appertains to make and use the same.

Where a centrifugal pump is employed for lifting a liquid from a lower to a higher level, and where one or both of said levels are subject to change, it has been found necessary, in order to obtain the greatest economy in the use of power, to vary the speed of the pump to suit the existing differential in head.

The main object of my invention is to provide a pumping apparatus which comprises means for automatically varying and maintaining the speed of the device that drives the pump, so that the highest efficiency in operation may be obtained at any differential in head within the range of the apparatus.

Another object is to provide a pumping apparatus in which the speed governor of the device that drives the pump is influenced or varied automatically by any variation in the differential between the two heads, thereby causing the device that drives the pump to be always maintained at the speed for which the pump is most efficient for the then existing differential in head.

Another object is to provide a pumping apparatus in which any variation in the differential between the two heads will automatically change the governor that controls the speed of the pump-driving device, but any corresponding variation in the level of the two bodies of liquid will have no effect on or will not alter said speed governor.

Another object is to provide a speed governing mechanism for pumping apparatus, which comprises a controlling member that moves automatically when the differential between the two heads varies and thus automatically changes the speed or condition of the speed governor on the device that drives the pump, said controlling member being so designed that it will cause the pump-driving device to always be maintained at the speed for which the pump is most efficient for the particular work it is required to do.

Another object is to provide a pumping apparatus which comprises a gage that indicates to the operator in charge of the apparatus the differential in head that exists between the two bodies of liquid between which the pump is arranged.

Other objects and desirable features of my invention will be hereinafter pointed out.

Figure 1 of the drawings is an elevational view, illustrating a pumping apparatus constructed in accordance with my invention. Fig. 2 is an enlarged front elevational view of the speed governor of the device that drives the pump, and illustrates one method of causing the speed of the pump to vary to suit the existing differential in head. Fig. 3 is a side elevational view of said speed governor, showing the controlling member of my improved speed governing apparatus in section. Fig. 4 is a front elevational view, illustrating a modification of my invention, and Fig. 5 is a horizontal sectional view, taken on the line 5—5 of Fig. 4.

It is immaterial, so far as my invention is concerned, what particular type of pump is employed, what particular type of device or prime mover is employed for driving the pump, or what particular type of governor is employed for controlling the speed of the pump-driving means, and while I have herein illustrated my invention embodied in an apparatus that is used for pumping water from the suction basin into the discharge basin of a water supply system, I wish it to be understood that my invention is applicable to any pumping apparatus that is employed for lifting a liquid from a lower to a higher level.

Referring to the drawings, which illustrate two different forms of my invention, A designates a centrifugal pump that is used for pumping water from the suction basin 1 into the discharge basin 2 of a water supply system. Said pump is driven by a device B, which may consist of an internal combustion engine of the heavy oil type to which fuel oil is supplied by a variable feed pump C. The engine B is provided with a centrifugal speed governor D of the kind now generally used on engines of the type mentioned, which governor comprises spring-pressed weights 50 that are operatively connected with the collar 4 of the governor by means of links and bell crank levers, as shown in broken lines in Fig. 2. The governor D automatically governs the supply of oil from the fuel pump C, so that more or less fuel will be supplied to the cylinders of the engine B, according to the speed of said engine, the fuel pump C being controlled by a lever or other suitable device 3 that is operatively connected to the collar 4 of the speed governor D, which collar rises and falls as the speed of the engine B varies. The speed governor D is driven from the engine B, preferably by means of a belt 5, that drives a pulley 6 which imparts movement to a device 7 on the vertical shaft 8 of the governor D, as shown in Figs. 2 and 3, the belt 5 passing around a pulley 5ª on the driving shaft of the engine B and the pulley 6 being carried by a shaft 6ª that is journaled in a bearing 9 in the frame 10 that carries the vertical shaft 8 of the speed governor D. In the apparatus herein shown the device 7, which transmits movement from the pulley 6 to the vertical shaft 8 of the speed governor, consists of a friction disk on said shaft 8 that bears against the front side face of the pulley 6, as shown in Figs. 2 and 3.

In order that the highest efficiency in operation may be obtained at any differential in head, I have provided the apparatus with means whereby any variation in the differential in head between the two bodies of liquid 1 and 2 will automatically change the speed ratio between the speed governor D and the engine, so that said speed governor will maintain the engine B at the speed for which the pump A is most efficient for the then existing differential in head. In other words, I have constructed the apparatus in such a manner that the speed governor D will hold the speed of the engine B within certain limits when a certain differential in head exists and will hold the speed of the engine B within different limits when the differential in head varies or changes. In the apparatus shown in Figs. 2 and 3 this is accomplished by changing the position of the disk 7 on the vertical shaft 8 of the speed governor with relation to the pulley 6 that drives said disk, so as to vary the speed ratio between the shaft 8 and the engine. The disk 7 is arranged at right angles to the face of the pulley 6 upon which it bears; consequently, when said disk is arranged close to the axis of rotation of the pulley 6, the governor shaft 8 will rotate at relatively low speed compared with the speed of the engine, and when said disk 7 is arranged farther away from the axis of rotation of the pulley 6, the governor shaft 8 will rotate at a relatively higher speed compared with the engine speed. The disk 7 can either be splined on the shaft 8 and moved longitudinally thereof, so as to vary the position of said disk with relation to the pulley 6, or the governor shaft 8 can be formed in two sections and connected together in such a manner that the lower section to which the disk 7 is connected can be moved longitudinally with relation to the upper section that carries the main moving parts of the governor. I prefer to construct the governor shaft in the manner last mentioned, and therefore have provided the upper section 8ª of said shaft with a collar 11, into which the upper end of the lower section of the shaft projects, said collar 11 having elongated slots 12 that receive a cross pin 13 on the lower section of the shaft, so as to couple both sections of the shaft together but still permit the lower section to be moved vertically with relation to the upper section. The lower end of the movable section of the vertical shaft of the speed governor D, designated in the drawings by the reference character 8, is journaled in a movable bearing 14 whose position is governed by a controlling member E. This controlling member E can be formed in various ways and it is combined with a means that causes the position of said controlling member to change automatically, whenever the differential in head between the two bodies of liquid 1 and 2 varies.

In the apparatus shown in Figs. 1 and 2 the controlling member E is in the form of a disk provided with a cam groove 15 that receives a pin or roller 16 on a depending arm 17 on the movable bearing 14, said disk being mounted on a horizontally-disposed shaft 18 that is journaled in the stationary support 10. A rack bar 19 that meshes with a pinion 20 on the shaft 18 is connected by means of a link 21 with a bell crank lever 22 that is under the direct control of two elements 23 and 24 whose positions are governed by the bodies of liquid 1 and 2, respectively, said elements 23 and 24 consisting of pistons mounted in cylinders 23ª and 24ª, respectively, which are connected by means of pipes 23ᵇ and 24ᵇ with the suction basin 1 and with the discharge basin 2, respectively. Both of the pistons 23 and 24 are rigidly connected to a rod 25 provided with a collar 26 to which the bell crank lever 22 is pivotally connected, and a coiled spring 27 is mounted on the rod 25 on one side of the collar 26, as shown in Fig. 2, so as to hold the lever 22 and the controlling member E in the position shown in Fig. 2 when the average differential in head exists, thereby causing the governor D of the engine B to hold said engine at the speed at which the pump A is most efficient for pumping the water from the receiving basin 1 into the discharge basin 2, when this particular differential in head exists. If the level of the water in the suction basin 1 rises at the same rate that the level of the water in the discharge basin 2 rises, or if the levels of the two bodies of water in said basins drop correspondingly, no change in the position of the bell crank lever 22 or the controlling device E will occur, owing to the fact that the elements 23 and 24 are then subjected to the same relative degree of pressure that they were subjected to when the average differential in head existed. If, however, the level of one body of liquid changes while the level of the other body of liquid remains the same, or, in other words, if the elements 23 and 24 are thrown out of balance, due to an increase of pressure on one of said elements or a reduction of pressure on the other element, the bell crank lever 22 will move, and consequently, will cause the position of the controlling member E to be changed. Whenever the member E is moved in either direction away from its neutral position shown in Figs. 2 and 3, the speed of the governor shaft 8 will be varied. This change in the condition of the speed governor D effects a change in the speed of the pump A, and consequently, causes the operation of the pump to be varied to suit the existing differential in head. From the foregoing it will be seen that the levels of the bodies of liquid in the suction basin and in the discharge basin can rise correspondingly and fall correspondingly without causing any change in the speed of the pump, but any variation in the differential between the two heads will cause the speed of the pump to vary automatically, or, in other words, operate at the speed for which it is most efficient for the particular work it is required to do.

As previously stated, it is immaterial what kind of a controlling member is employed for changing the relative position of the driving member 6 and the driven member 7 of the mechanism that operates the speed governor D, but I prefer to use a controlling member consisting of a wedge or cam, owing to the fact that the operating surface of such a device may be determined easily by tests with the particular pump and the particular device that is employed to drive the pump. After the most efficient speeds for the various heads have been determined a controlling member of wedge form or cam form can be easily laid out, so as to obtain these speeds, and said controlling member can then be arranged in operative position between the movable section of the speed governor shaft and the elements whose positions are governed by the differential in head. The movable bearing 9 in which the shaft of the pulley 6 is mounted is preferably provided with adjusting screws 9ª, as shown in Fig. 3, so as to enable the pulley 6 to be pressed tightly against the friction disk on the shaft of the speed governor D.

In Fig. 4 I have illustrated another way of moving the lower section 8 of the vertical shaft of the speed governor D, so as to vary the speed of said shaft and thus change the speed ratio between the speed governor and the engine. In the apparatus shown in Fig. 4 the adjustable bearing 14, which supports the lower end of the shaft of the speed governor D, is provided with a depending arm or extension 17ª that is connected to a vertically movable slide 30 which carries a rotatable pinion 31 that meshes with two rack bars 32 and 33 which are combined with mechanism that causes the slide 30 to move upwardly or downwardly when the differential in head between the two bodies of liquid in the suction basin 1 and in the discharge basin 2 varies. Said mechanism consists of two drums or pulleys 34 and 35, which are provided with internal screws that mesh with screw-threaded portions 32ª and 33ª on the rack bars 32 and 33, respectively. A float 36 that is arranged in the suction basin 1 is connected to a weight 37 by means of a cable 38 which passes around the drum or pulley 34, said cable 38 being guided by sheaves 39 arranged in the manner shown in Fig. 4. A float 40 that is arranged in the discharge basin 2 is connected with a weight 41 by means of a cable 42 that passes around the drum 35 and over guide sheaves 43 arranged in the manner shown in Fig. 4. When the levels of the bodies of liquid in the basins 1 and 2 rise correspondingly the drums or pulleys 34 and 35 will rotate simultaneously in opposite directions but the same distance and will thus cause the rack bar 32 and the rack bar 33 to move simultaneously in opposite directions, and consequently, cause the pinion 31 to turn without imparting any vertical movement to the slide 30. This is also true when the levels of the bodies of liquid in the basins 1 and 2 drop correspondingly. When the differential in head varies, however, as, for example, by a drop in level of the liquid in the suction basin 1, the rack bar 32 will move while the rack bar 33 remains at rest, and consequently, will cause the slide 30 to move longitudinally and effect a change in the relative position of the disk 7 on the vertical shaft of the speed governor and the driving pulley 6 that bears against the periphery of said disk. It will thus be seen that the mechanism illustrated in Fig. 4 accomplishes exactly the same result as the mechanism shown in Figs. 2 and 3, owing to the fact that any variation in the differential in head results in a change in the speed ratio between the speed governor D and the engine, and any corresponding rise or fall in the level of both bodies of liquid has no effect on the speed governor or the engine or pump-driving device which said speed governor controls. In order that the operator in charge of the apparatus may know just what differential exists at any time I have provided a visual indicator which is so designed and arranged that it can be observed by the operator. This indicator may be formed in various ways, but in the form of my invention illustrated in Fig. 4 it consists of a hand or pointer 44 on the vertically movable slide 30 that coöperates with a scale 45 marked with numerals or other characters, so as to indicate when the pointer 44 stands opposite the numeral 3 that a differential in head of 3 feet exists, when it stands opposite the numeral 4 a differential in head of 4 feet exists, etc.

My invention is applicable to any pumping apparatus that is employed for lifting a liquid from a lower to a higher level, and while I have herein illustrated two different forms of my invention, I wish it to be understood that my broad idea is not limited to any particular type of pump-driving device, or to any particular mechanism for effecting a change in the speed of said device, as my broad idea consists in providing a pumping apparatus with means governed by the differential in head between the two bodies of liquid between which the pump is arranged for automatically varying and maintaining the speed of the pump-driving device, so that the highest efficiency in the operation of the pump will be obtained at all times.

Having thus described my invention, what I claim and desire to secure by Letters Patent, is:

1. In a pumping apparatus for lifting a liquid from a lower to a higher level, the combination of a pump, a driving device for the pump, and means governed by the differential in head between the two bodies of liquid for automatically varying the speed of the pump driving device as the differential in head varies.

2. In a pumping apparatus for lifting a liquid from a lower to a higher level, the combination of a pump, a driving device for the pump, and means governed by the differential in head between two bodies of liquid for automatically adjusting and maintaining the speed of the pump driving device so as to obtain the highest efficiency in the operation of the pump for the existing differential in head.

3. In a pumping apparatus for lifting a liquid from a lower to a higher level, the combination of a pump, a driving device for the pump, and means controlled by the bodies of liquid between which the pump is arranged for causing the speed of the pump to vary automatically as the differential in head between said bodies of liquid varies, said means being so constructed that any corresponding rise or fall in the levels of said bodies of liquid does not effect a change in the speed of the pump.

4. In a pumping apparatus for lifting a liquid from a lower to a higher level, the combination of a pump, a device for driving the pump, and a speed governing mechanism for the pump-driving device comprising means governed by the differential in head between the two bodies of liquid between which the pump is arranged for causing the speed of the pump to vary automatically whenever there is a variation in the differential in head, but any corresponding change in the level of the two bodies of liquid will not effect a change in the speed of the pump.

5. In an apparatus of the character described, a pump arranged so that it will lift a liquid from a lower to a higher level, a device for driving said pump, a speed governor for said pump-driving device, and means for automatically changing the speed ratio between said device and said speed governor only in case the differential in head between the two bodies of liquid varies.

6. In an apparatus of the character described, a pump arranged to lift a liquid from a lower to a higher level, a device for driving said pump, a speed governor for said pump-driving device, and means coöperating with said speed governor and controlled by the differential in head between the two bodies of liquid between which the pump is arranged for causing the governor to hold the pump-driving device at the speed for which the pump is most efficient for the work it is required to do at any time while the apparatus is in operation.

7. In an apparatus of the character described, a pump for lifting a liquid from a lower to a higher level, a device for driving said pump, a speed governor for said device provided with an operating shaft, and means for causing the speed of said operating shaft to vary automatically as the differential in head between the two bodies of liquid varies.

8. In an apparatus of the character described, a pump for lifting a liquid from a lower to a higher level, a device for driving said pump, a speed governor for said device provided with an operating shaft, and mechanism for controlling the speed of the operating shaft of said governor comprising two devices governed by the levels of the two bodies of liquid between which the pump is arranged and constructed in such a manner that they will effect a change in the speed of the governor only in case the differential in head between said bodies of liquid varies.

9. In an apparatus of the character described, a pump for lifting a liquid from a lower to a higher level, a device for driving said pump, a speed governor for said device provided with an operating shaft, and a controlling mechanism for said operating shaft comprising means whereby a change in the level of one body of liquid and a corresponding change in the level of the other body of liquid will have no effect on the speed ratio between the pump-driving device and said shaft.

10. In an apparatus of the character described, a pump arranged to lift a liquid from a lower to a higher level, a device for driving said pump, a speed governor for said device provided with an operating shaft, and means that is rendered operative by a variation in the differential in head between the two bodies of liquid for automatically changing the speed of said operating shaft so as to cause the pump to operate at the speed at which it is most efficient for the differential in head that then exists.

11. A pumping apparatus provided with a speed governing mechanism that comprises a cam or other suitable controlling member, and means for causing said member to remain in a certain position when the differential in head that exists between two bodies of liquid remains constant and to change when said differential varies.

12. In an apparatus of the character described, a pump arranged to lift a liquid from a lower to a higher level, a device for driving said pump, a speed-governing mechanism for said pump-driving device that comprises a controlling member, and means for causing the position of said controlling member to change automatically only in case the differential in head between the two bodies of liquid between which the pump is arranged varies.

13. In a pumping apparatus for lifting a liquid from a lower to a higher level, a pump, a driving device for the pump, means controlled by the differential in head between the two bodies of liquid for regulating the speed of the pump, and a visual indicator that shows the existing differential in head.

14. In an apparatus for lifting a liquid from a lower to a higher level, a pump, a device for driving said pump, a speed governor for said device comprising an element that moves only in case the differential in head between the two bodies of liquid varies, and means under the influence of said element for indicating the existing differential in head.

15. In an apparatus for lifting a liquid from a lower to a higher level, a pump, a device for driving said pump, a speed governor for said device comprising an element that moves only when the differential in head between the two bodies of liquid varies, and a visual indicator operated by said element for showing the existing differential in head.

16. In an apparatus of the character described, a speed governor provided with an operating shaft, a driving means for said shaft, and means operated only by a variation in the differential in head between two bodies of liquid for varying the speed of said operating shaft with relation to said driving means.

17. In an apparatus of the character described, a speed governor comprising an operating shaft provided with a friction disk, a driving member for said disk arranged at right angles thereto and bearing upon the periphery of the disk, and means for causing said disk to be moved toward and away from the axis of rotation of said driving member as the differential in head between two bodies of liquid increases and diminishes, and to remain in a certain position with relation to said member when the levels of said bodies rise or drop correspondingly.

18. In a pumping apparatus, a pump for lifting a liquid from a lower to a higher level, a driving device for said pump, an automatically operated indicator which shows the existing differential in head between the two bodies of liquid, and means for varying the speed of the pump only in case the differential in head between said bodies varies so as to suit the pump to the existing differential in head.

19. In a pumping apparatus for raising a liquid from a lower to a higher level, a pump, a driving device for said pump, a speed governor for said device comprising a member that is adapted to be moved so as to change the speed of said engine, an operating mechanism for said member which is influenced by any variation in the differential in head between the two bodies of liquid, and a variable controlling element arranged between said mechanism and member for actuating said member.

20. In a pumping apparatus, a pump arranged between two bodies of liquid whose levels are different, a device for driving said pump, a speed governor for said pump driving device, a cam or equivalent controlling member for regulating the operation of said speed governor, and an operating means for said controlling member comprising pressure operated devices under the control of said bodies of liquid which are so arranged that the position of said controlling member will change only in case the differential in head between said bodies of liquid varies.

21. In an apparatus of the character described, a pump arranged between two bodies of liquid whose levels are different, a device for driving said pump, a speed governor for said pump driving device comprising an operating shaft that is adapted to be moved in different directions so as to vary the speed of the pump driving device, a controlling member provided with a cam surface that governs the position of said operating shaft, pressure operated devices that move automatically only in case the differential in head between the two bodies of liquid varies, and means for transmitting movement from said pressure operated devices to said controlling member.

In testimony whereof I hereunto affix my signature in the presence of two witnesses, this twenty-second day of October, 1915.

GEORGE D. POGUE.

Witnesses:
WELLS L. CHURCH,
GEORGE BAKEWELL.